United States Patent Office 3,268,547
Patented August 23, 1966

3,268,547
5,6-DIHYDRO-4H-TETRAZOLO[5,1-e]1,6-BENZOTHIAZOCINE
Richard J. Mohrbacher, Fort Washington, Pa., assignor to McNeil Laboratories, Incorporated, a corporation of Pennsylvania
No Drawing. Filed June 8, 1965, Ser. No. 462,404
1 Claim. (Cl. 260—308)

This invention relates to a novel heterocyclic ring system. More particularly, this invention concerns 5,6-dihydro-4H-tetrazolo[5,1-e]-1,6-benzothiazocine having the formula

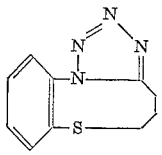

The compound of this invention shows valuable pharmacologcal activity in animals such as hypotensive activity.

The compound of this invention is prepared generally by reacting 3,4-dihydro-1-benzothiepin-5(2H)-one with excess hydrazoic acid under conditions of the Schmidt reaction in a suitable solvent such as chloroform or benzene in the presence of an acid catalyst such as sulfuric acid.

The following example will serve to illustrate but not to limit the scope of the present invention.

Example

A chloroform solution of hydrazoic acid is prepared by treating a cooled (ice bath) stirred mixture of 65 g. (1 mole) of sodium azide, 65 ml. of water and 400 ml. of chloroform with 98 g. (1 mole) of concentrated sulfuric acid. The chloroform layer is decanted and dried in the cold for several hours over magnesium sulfate. The total volume of hydrazoic acid solution is 500 ml. To 117 ml. of the dried hydrazoic acid solution (0.29 mole) is added 50 g. (0.28 mole) of 3,4-dihydro-1-benzothiepin-5(2H)-one. The stirred solution is cooled to −20° C. and the dropwise addition of 98 g. (1 mole) of concentrated sulfuric acid is started. When the temperature reaches −28° C., a viscous orange foam is formed on the surface of the solution. The reaction mixture is cooled to −20° C., another 120 ml. of hydrazoic acid solution is added and the addition of sulfuric acid is started again. The temperature is kept below −10° C. for the rest of the addition. The foamy reaction mixture is stirred for 30 minutes and then poured into a solution of 127 ml. of concentrated ammonium hydroxide in ice water. The chloroform layer is separated, washed again with aqueous ammonium hydroxide, then brine and dried over magnesium sulfate. The organic solution is concentrated in vacuo to give a mixture of the desired tetrazole and 3,4-dihydro-2H-1,6-benzothiazocin-6(5H)-one. The mixture is dissolved in 950 ml. of hot ethyl acetate. The solution is filtered, concentrated to 325 ml. and cooled. The first crop of crystalline 3,4-dihydro-2H-1,6-benzothiazocin-6(5H)-one is removed by filtration. Further concentration of the filtrate yields impure tetrazole. The crystals are dissolved in ethanol and boiled with dilute hydrochloric acid to remove the ethyl acetate and ethanol. The resultant slurry is cooled and extracted 5 times with benzene. The benzene layers are combined, washed with brine, dried and concentrated to dryness in vacuo. The oil is dissolved in ethyl acetate and cooled to give crystalline tetrazole. Two recrystallizations from ethyl acetate provides pure 5,6-dihydro-4H-tetrazole[5,1-e]-1,6-benzothiazocine; M.P. 137.5–139.5° C.

What is claimed is:
5,6-dihydro-4H-tetrazolo[5,1-e]-1,6-benzothiazocine.

No references cited.

HENRY R. JILES, *Acting Primary Examiner.*
A. D. ROLLINS, *Assistant Examiner.*